Nov. 19, 1963

F. L. HERRMANN ETAL 3,111,148

DUPLICATOR STAND WITH ROUTER

Filed April 14, 1960

Fred L. Herrmann
Leland Safranek
INVENTORS

BY Clarence A. O'Brien
and Harvey B. Jacobson
Attorneys

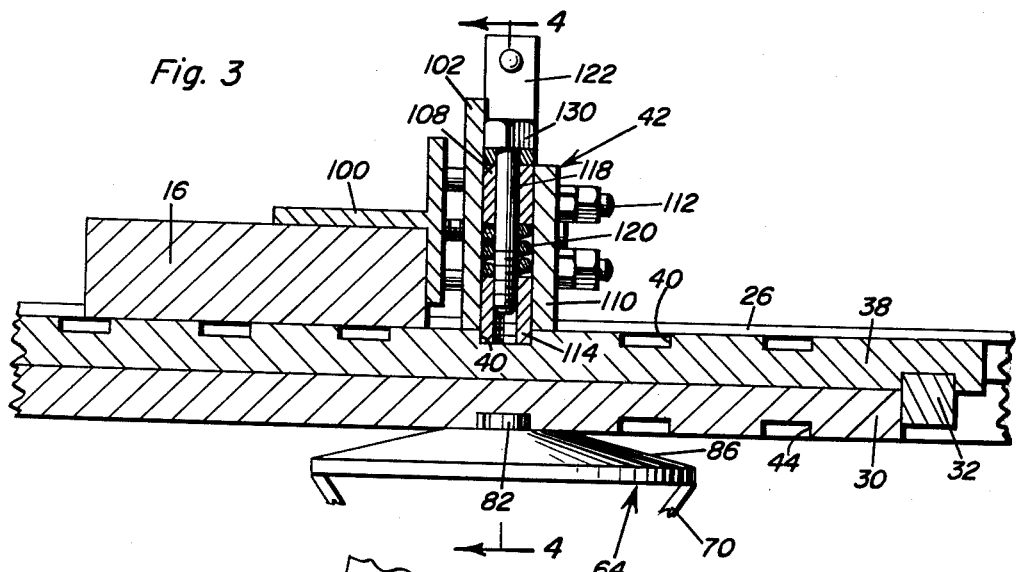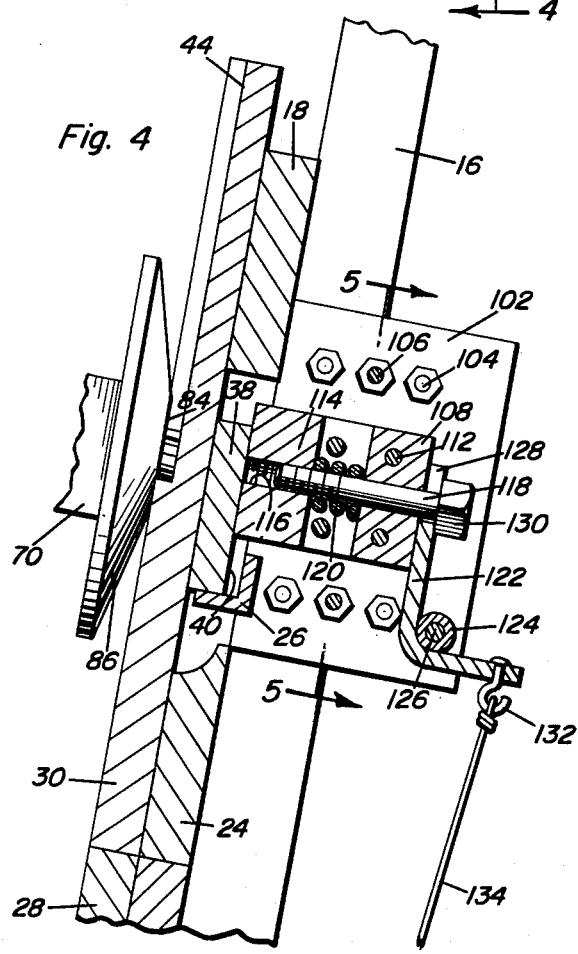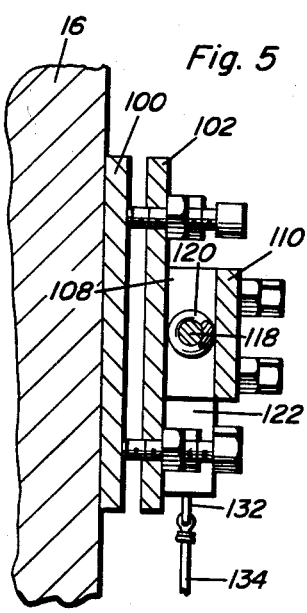

United States Patent Office 3,111,148
Patented Nov. 19, 1963

3,111,148
DUPLICATOR STAND WITH ROUTER
Fred L. Herrmann and Leland Safranek, both of
Rte. 2, Box 92, Atascadero, Calif.
Filed Apr. 14, 1960, Ser. No. 22,318
11 Claims. (Cl. 144—136)

The present invention generally relates to a machine for use in wood working and especially for use in conjunction with plywood and includes a mechanism for holding a plywood panel or other suitable panel in position and also guiding a tool along a predetermined path while the tool is engaged with the panel and performing an operation thereon.

The primary object of the present invention is to provide a supporting stand having a novel guide mechanism thereon and work holding mechanism whereby a working tool may be mounted on the guide mechanism for performing some operation on the work in an efficient and accurate manner with the work holding mechanism enabling the operation to be duplicated on the work thereby enabling a number of operations to be carried out in an extremely efficient manner.

Another object of the present invention is to provide a device in accordance with the preceding object in which the guide mechanism includes generally vertically disposed guide rails with the working tool movable on the guide rails with the weight of the working tool being counterbalanced to facilitate the movement thereof.

A further object of the present invention is to provide a combined supporting stand and working tool in which the supporting stand includes a mechanism for following a template so that a template may be attached to the stand and workpieces secured thereon so that the workpieces may be operated upon by the working tool for duplicating the template any number of times desired.

Yet another important object of the present invention is to provide a novel router construction incorporating a depth control that will form a groove of a uniform depth regardless of the thickness of the work.

Yet another feature of the present invention is to provide a duplicator stand having a novel router mounted thereon with the router having the features as set forth in the immediately preceding paragraph for cutting a uniform depth groove in panels even though they may be warped or otherwise have irregularities therein.

Still another important feature of the present invention is to provide a machine in accordance with the preceding objects including a supporting stand and guide mechanism in which various working tools may be employed such as saws or the like for dadoing.

Other important features of the present invention will reside in its simplicity of construction, safety in operation, adaptability for various widths and lengths of panels employed therein, efficiency in operation and generally inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 3 is a detailed sectional view taken substantially upon a plane passing along section line 3—3 of FIGURE 2 illustrating further structural details of the router and the relationship of the duplicator device, the template and the work;

FIGURE 4 is a detailed sectional view taken substantially upon a plane passing along section line 4—4 of FIGURE 3 illustrating further structural details of the duplicating mechanism;

FIGURE 5 is a detailed sectional view taken substantially upon a plane passing along section line 5—5 of FIGURE 4 illustrating further structural details of the duplicator mechanism.

Figure 1:
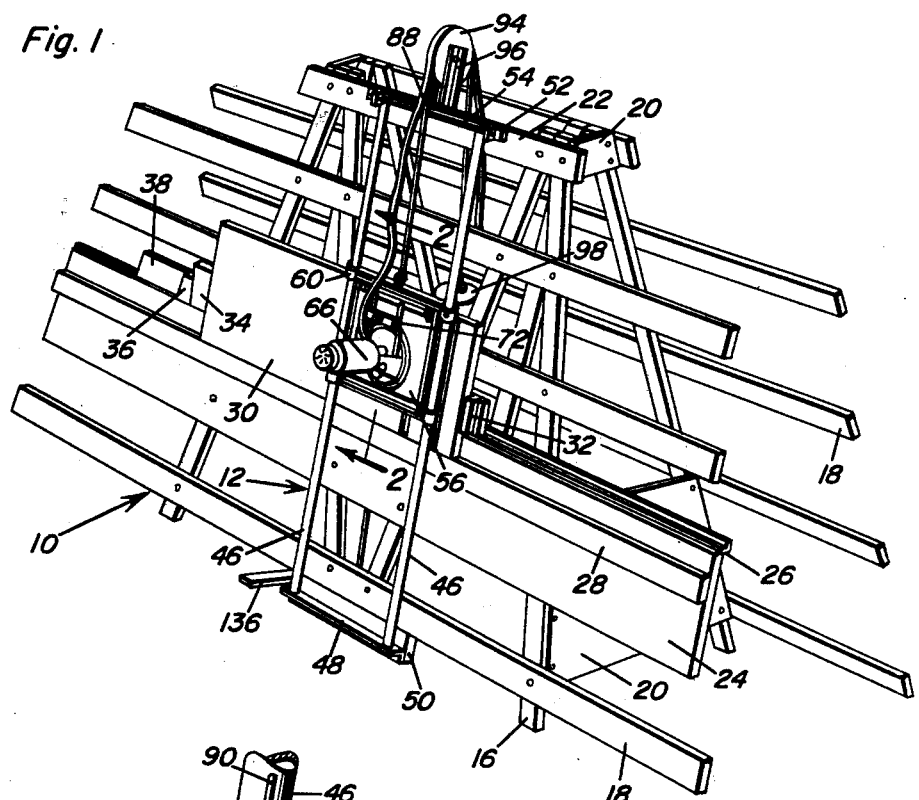
FIGURE 1 is a perspective view of the machine of the present invention illustrating the machine in operation.
Figure 2:
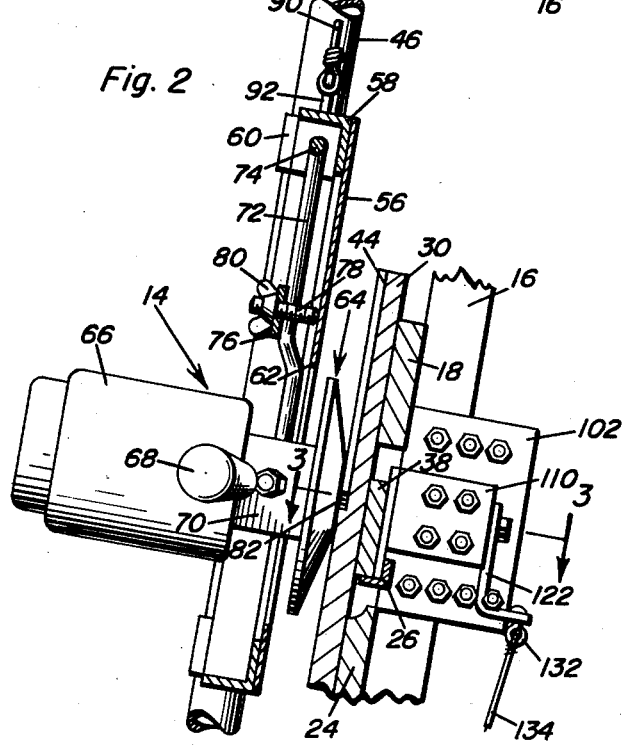
FIGURE 2 is a detailed sectional view taken substantially upon a plane passing along section line 2—2 of FIGURE 1 illustrating the details of construction of the router and the relationship of the duplicating device to the work and the template.

The machine of the present invention includes a supporting stand generally designated by the numeral 10 having a guide mechanism generally designated by the numeral 12 mounted thereon together with a working tool generally designated by the numeral 14 movable on the guide mechanism 12.

The supporting stand includes a plurality of upwardly extending and converging legs 16 interconnected by a plurality of longitudinally extending rails 18 and transverse brace members 20 or the like. The particular orientation and configuration of the legs 16, the rails 18 and the cross braces 20 may vary. However, there should be a bottom rail 18 and a top rail 22 that is considerably shorter than the bottom rail 18 and the other rails similar to the bottom rail 18. The components of the supporting stand may conveniently be conventional wood members secured together by any suitable means. Attached to one set of legs 16 which face the side of the stand having the guide mechanism 12 thereon, there is provided an enlarged and elongated board or panel member 24 having an angle iron guide 26 mounted on the upper edge thereof and a work rest or guide 28 mounted on the outer face thereof in spaced relation below the guide 26. Supported on the ledge or guide 28 is a workpiece 30 such as a plywood panel or the like that engages an abutment 32 at one end thereof and a wedge 34 at the other end thereof which in turn engages an abutment block 36. The abutment blocks 32 and 36 are carried by a template member 38 which is slidably received on the angle iron track or guide 26, for movement therealong. Thus, the workpiece 30 is slidably supported for movement under the guide mechanism 12 with the template 38 being attached to and movable with the workpiece 30.

The template 38 is conveniently provided with a predetermined arrangement of grooves 40 or other suitable recesses, or the like and by employing the template and duplicator mechanism generally designated by the numeral 42, an identical series of grooves 44 may be provided in the workpiece 30 thus enabling duplication of the recesses or grooves 40 that are in the template in a plurality of workpieces 30 with it only being necessary to install the workpieces 30 in the same relationship to the template 38 which would be accomplished by the abutment blocks 32 and 36 and the wedge 34.

The guide mechanism 12 includes a pair of elongated tubular members 46 which are disposed in spaced parallel relation to each other with the lower ends thereof being rigidly connected to an angle iron member 48 attached to a supporting bracket 50 secured to the bottom rail 18. The upper ends of the tubular members 46 are attached to brackets 52 and are rigidly interconnected by a transverse brace member 54.

Slidably disposed on the tubular guides or tracks 46 is the working tool 14 which includes a plate 56 generally parallel to the inner surface of the tubular members 46. The plate 56 is attached to an angle iron frame 58 received within the confines of the tubular members 46 with the corners of the frame 58 having cylindrical sleeves 60 rigidly secured thereto as by welding with the sleeves 60 being slidably disposed in encircling relation to the tubular guide members 46.

The plate 56 is provided with an enlarged opening 62 therein which movably receives a router head generally designated by the numeral 64 which includes a driving motor 66 and a handle 68 attached to a supporting frame 70. The supporting frame 70 is connected to a pair of supporting rods 72 extending alongside the outer surface of the plate 56 and the upper ends of the rods 72 are pivotally supported by a rod 74 journaled in the frame 58. Intermediate the ends of the rods 72, there is provided a transverse plate 76 receiving an adjustment screw 78 threaded therethrough with the inner end of the adjustment screw being rounded and engaging the plate 56 for forming a depth limit for movement of the working head 64 of the tool 14. A wing lock nut 80 is provided for locking the depth screw 78 in adjusted position. As stated previously, a router is shown with the working head 64 including a router tool 82 for cutting a groove 44 in the workpiece 30 and extending outwardly from the tool 82 is a flat circular portion 84 and an inclined conical portion 86 which has an inclined surface that is relatively shallow. The inclined surface 86 will act as a cam surface for engaging the surface of the work and elevating the working tool 14 so that the tool or bit 82 may engage the workpiece 30 for cutting a groove 44 of predetermined depth. By adjusting the relationship between the tool bit 82 and the circular flat surface 84, the depth of cut may be adjusted. Regardless of whether the workpiece 30 is warped or whether there are a series of workpieces of different thicknesses, the working tool 14 will cut a groove of constant uniform depth as it is moved longitudinally on the guide members 46.

The electric motor 66 is provided with suitable controls and is also provided with an electrical conductor 88 connected thereto which extends vertically in generally overlying relation to a flexible line or cable 90 attached to an eye member 92 at the upper end of the frame 58. Both the cable 88 and the flexible cable 90 extend over a pulley or sheave 94 supported by upstanding brackets 96. The conductor 88 extends to a suitable source of electrical energy and has sufficient excess length to enable the working tool 14 to move the full length of the guide members 46. The flexible line 90 is attached to a counterweight 98 movable vertically within the interior of the stand and in order to assure movement of the line and conductor 88, the conductor 88 may be attached to the line adjacent the counterweight or actually attached to the counterweight thereby aiding in movement of the working tool 14 on the guide mechanism 12 with a minimum of manual effort being required.

The duplicator mechanism 42 includes a T-shaped structural member 100 having one flange attached to the rear surface of a leg member 16 and the transverse leg having a portion extending against the side edge of the leg 16 as illustrated in FIGURE 3. Disposed in spaced relation to the leg 16 and in perpendicular relation to the template 38 is a mounting plate 102 secured to the member 100 by bolts or fasteners 104. Adjustment screws 106 extend through the plate 102 and engage the transverse flange of the member 100 for adjusting the angular orientation of the mounting plate 102. Attached to the surface of the mounting plate 102 opposite from the member 100 is a substantially L-shaped block assembly comprising members 108 and 110. A long leg 110 of the block assembly is disposed in spaced parallel relation to the mounting plate 102. The block assembly is secured to the mounting plate by virtue of bolts or fasteners 112. The L-shaped block assembly and particularly the long leg 110 thereof provides a guide for a template engaging plunger or block 114. The plunger 114 is provided with a threaded bore 116 receiving the threaded end of an operating bolt 118. A compression coil spring 120 encircles the bolt 118 and has one end thereof engaging the plunger 114 and has the other end thereof engaging the L-shaped block assembly 108 for urging the plunger 114 towards the template 38. Thus, as long as the plunger 114 engages the groove 40 in the template 38, then the template will be locked in position along with the workpiece 30 for forming a groove 44 in the workpiece 30.

For retracting the bolt 118 and the plunger 114, a bell crank member 122 is provided with the apex thereof attached to a bearing sleeve 124 mounted on a bolt 126 at the lower corner of the mounting plate 102. One end of the bell crank 122 is provided with a slot 128 which forms a bifurcated end which receives the bolt 118 inwardly of the bolt head 130 whereby downwardly swinging movement of the other leg of the bell crank 122 for pivoting the bell crank about the axis 126 will cause retraction of the bolt 118 thus withdrawing the plunger 114 from the groove 40 in the template 38.

The outer end of the lower leg of the bell crank 122 is provided with a hook 132 connected to a flexible line or wire 134 which extends downwardly and is connected with a pivotal foot pedal 136 supported at the bottom of the stand whereby the foot pedal 136 may be employed for operating the bell crank 122 thereby releasing the plunger 114 from the groove 40 in the template 38 for enabling the template to be moved to bring the next groove into alignment with the plunger whereby the spring 120 will urge the plunger into the next adjacent groove since the operator will normally release the pedal as soon as the template has been released.

Figure 6:
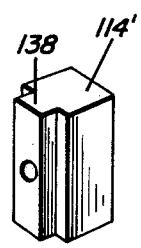
FIGURE 6 is a perspective view of the template engaging member illustrating the manner in which this member is interchangeable.

FIGURE 6 illustrates a modified form of plunger designated by reference numeral 114' which has the template engaging face thereof provided with a longitudinal projection 138 which is of less width than the remainder of the plunger whereby the plunger 114 may be removed from the bolt 118 and replaced with a plunger 114' of various shapes or configurations for engagement with particular shapes or orientations of grooves or recesses in the template.

In actual practice and for ease of assembly, the L-shaped block 108 assembly may actually have a separate plate forming the elongated leg 110 thereof which is parallel to the mounting plate 102, which arrangement is shown in FIGURE 3, or it may be made in one integral piece.

In actual practice, plywood is grooved with a router which eliminates most of the splintering and chipping that occurs with a dado head on table saws especially in hardwood veneers. Further, grooves of a uniform depth are formed either across or with the grain. The counterbalanced router is normally moved vertically across the panel and the panel is rigidly secured in position and by operation of the duplicator, one handling of the panel is sufficient for producing any number of grooves therein. When desired, the router may be removed and other tools of a similar nature may be mounted thereon such as a saw or the like and the device is especially useful for those engaged in making cabinets, furniture or any job requiring grooves, dados or rabbeting of plywood or lumber of any type.

With the framework or supporting stand of the present invention including the guide mechanism and the working tool and the manner of mounting the working tool, an operator may produce accurate and precision type work. A power saw may be substituted for the router and the supporting stand actually is a mounting device for any one of a multiple of power tools which greatly increases its utility and usefulness since it is not restricted to any particular specific use. One use of the device when employed with a saw is the accurate square cut-off of panels such as four foot panels, which may be rested on a bottom supporting ledge and the tool supporting assembly may be adapted for supporting any standard portable power saw. Further, the major components of the supporting stand are constructed of readily available structural elements orientated in such a way to produce a desired novel and highly efficient machine.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A machine for performing an operation on a piece of work comprising a supporting stand, means on said stand for receiving and holding the piece of work, guide means mounted on said stand generally in overlying relation to the piece of work supported by the stand, a working tool mounted on said guide means for movement in relation to a workpiece mounted on the stand, said means for receiving and holding the piece of work including a template secured thereto, said template having a predetermined shape for controlling the operation on said piece of work, said supporting stand including a substantially vertically disposed frame inclined slightly and including a horizontal ledge for receiving a panel type workpiece, said guide means including a pair of parallel guides disposed in parallel relation to each other and in overlying relation to a workpiece supported on the ledge, said work tool including a supporting framework slidably mounted on the parallel guides, a power motor, a cutting member driven by the motor and supported therefrom, means securing the power motor and cutting member to the sliding frame for movement therewith whereby the cutting member may be moved in relation to the workpiece, said means mounting the motor and cutting member on the frame including a pivotal support whereby the orientation of the member may be varied in relation to the workpiece, said template being movably mounted on a ledge, said template including means supportingly engaging a workpiece, said template including a plurality of grooves therein to be duplicated on the workpiece, and means for selectively engaging the grooves in the template for locking the template and the workpiece in adjusted position.

2. The structure as defined in claim 1 wherein said cutting member is a router and is provided with a generally flattened circular member extending therearound and an inclined member extending around the circular member and acting as a cam surface to engage a workpiece whereby the cutting member is provided with a depth control device so that it will form a groove of uniform depth regardless of the thickness or other irregularities in the workpiece.

3. The structure as defined in claim 1 including a counterbalancing means for the work tool having a cable connected to the frame for supporting the tool, a pulley at the upper end of the stand and at the upper end of the guide mechanism, said cable extending over the pulley and having a weight on the downwardly extending free end for counterbalancing a portion of the weight of the tool.

4. The structure as defined in claim 1 wherein said means for engaging the grooves in the template includes a movable plunger, a supporting bracket attached to the stand and movably supporting the plunger for movement towards and away from the template, spring means interconnecting the plunger and bracket for urging the plunger towards the template, and foot operated means connected to the plunger for retracting the plunger for permitting freedom of movement of the template and the workpiece.

5. The structure as defined in claim 4 wherein said foot operated means includes a pedal mounted at the bottom of the stand, a flexible line connected to the pedal and movable longitudinally when the pedal is moved, a bell crank supported from the bracket at its apex and having one arm connected to the flexible line and the other arm connected to the plunger for retracting the plunger upon longitudinal movement of the flexible line.

6. The structure as defined in claim 5 wherein said stand is of skeletonized construction, said ledge for receiving the template including an angle iron metallic member, said means for retaining a workpiece on the template including an abutment on each end of the template, and a wedge engaging one of the abutments and an edge of a workpiece for retaining the workpiece in position.

7. A machine for performing an operation on a piece of work comprising a supporting stand, means on said stand for receiving and holding the piece of work, guide means mounted on said stand generally in overlying relation to the piece of work supported by the stand, said guide means adapted to mount a working tool for movement in relation to a workpiece mounted on the stand, said means for receiving and holding the piece of work including a template secured thereto, said template having a predetermined shape and being movably mounted on a ledge, said template including means supportingly engaging the workpiece, said template further including a plurality of grooves therein to be duplicated on the workpiece, and means for selectively engaging the grooves in the template for locking the template and the workpiece in adjusted position.

8. The structure as defined in claim 7 wherein said means for engaging the grooves in the template includes a movable plunger, a supporting bracket attached to the stand and movably supporting the plunger for movement toward and away from the template, means connected to the plunger for urging said plunger into engagement with the grooves, and means for retracting the plunger for permitting freedom of movement of the template and the workpiece.

9. The structure of claim 8 wherein said supporting stand includes a substantially vertically disposed frame inclined slightly and including a horizontal ledge for receiving the lower edge of the workpiece, said means for retracting the plunger including a pedal mounted at the bottom of the stand, a flexible line connected to the pedal and movable longitudinally when the pedal is moved, a bell crank supported from the bracket at its apex and having one arm connected to the flexible line and the other arm connected to the plunger for retracting the plunger upon longitudinal movement of the flexible line.

10. The structure of claim 9 wherein said stand is of skeletonized construction, said ledge for receiving the template including an angle iron metallic member, said means for retaining a workpiece on the template including an abutment on each end of the template, and a wedge engaging one of the abutments and an edge of a workpiece for retaining the workpiece in position.

11. A machine for performing an operation on a piece of work comprising a supporting stand, means on said stand for receiving and holding the piece of work, guide means mounted on said stand generally in overlying relation to the piece of work supported by the stand, said guide means adapted to mount a working tool for movement in relation to a workpiece mounted on the stand, said means for receiving and holding the piece of work including a template secured thereto, said template having a predetermined shape and being movably mounted on a ledge, said template including means supportingly engaging the workpiece, said template further including guiding portions thereon arranged in a predetermined pattern to be duplicated on the workpiece, and means for selectively engaging the template for locking the template and the workpiece in adjusted position.

(References on following page)